United States Patent [19]
Carney

[11] Patent Number: 5,590,156
[45] Date of Patent: Dec. 31, 1996

[54] MULTICHANNEL WIDEBAND DIGITAL RECEIVER MAKING USE OF MULTIPLE WIDEBAND TUNERS HAVING INDIVIDUALLY SELECTABLE GAINS TO EXTEND OVERALL SYSTEM DYNAMIC RANGE

[76] Inventor: Ronald Carney, 916 Flower St., NW., Palm Bay, Fla. 32907

[21] Appl. No.: 231,262

[22] Filed: Apr. 22, 1994

[51] Int. Cl.$^6$ .............................. H03K 9/00; H04B 1/06; H04Q 11/00
[52] U.S. Cl. .................. 375/316; 455/34.1; 375/340; 375/349
[58] Field of Search ................... 455/52.1, 33.1, 455/33.3, 34.1, 34.2, 33.2, 31.1, 63; 375/316, 200, 205, 317, 340, 287, 285, 345, 346, 347, 349, 350; 370/70, 58, 18, 21, 23; 380/34, 33, 40

[56] References Cited

U.S. PATENT DOCUMENTS

| | | | |
|---|---|---|---|
| 4,127,744 | 11/1978 | Yoshikawa et al. | 379/60 |
| 4,316,282 | 2/1982 | Macina | 370/70 |
| 4,613,990 | 9/1986 | Halpern | 455/33 |
| 4,713,806 | 12/1987 | Oberlander et al. | 370/58 |
| 4,785,447 | 11/1988 | Ichiyoshi | 370/70 |
| 4,817,192 | 3/1989 | Phillips et al. | 455/75 |
| 4,881,191 | 11/1989 | Morton | 364/724.13 |
| 5,287,544 | 2/1991 | Menich et al. | 455/33.1 |
| 5,289,464 | 2/1994 | Wang | 370/69.1 |
| 5,323,391 | 6/1994 | Harrison | 370/70 |
| 5,351,269 | 9/1994 | Schilling | 375/205 |

FOREIGN PATENT DOCUMENTS

| | | |
|---|---|---|
| 407260A1 | 1/1991 | European Pat. Off. |
| 9410772 | 5/1994 | WIPO |

OTHER PUBLICATIONS

Bonnerot, et al., "Digital Processing Techniques in the 60 Channel Transmultiplexer", IEEE Transactions on Communications vol. COM-26, May 1978, pp. 698–706.

Bellanger, et al., "TDM–FDM Transmultiplexer: Digitial Polyphase and FFT", IEEE Transactions on Communications, vol. COM-22, Sep. 1974, pp. 1199–1205.

Bakhru, "Multi–Channel Digital Sonobouy Receiver", in MILCOM 90: IEEE Military Communications Coference Record, (New York:: Institute of Electrical and Electronic Engineers, 1990), vol. 3, pp. 1250–1255.

(List continued on next page.)

*Primary Examiner*—Wellington Chin
*Assistant Examiner*—William Luther
*Attorney, Agent, or Firm*—David J. Thibodeau, Jr.

[57] ABSTRACT

A technique for extending the instantaneous dynamic range available in a wideband digital basestation for use in a wireless communication network. The basestation processes the bandwidth allocated to it in two or more sub-bands. The sub-bands are each processed by a digital tuner section consisting of an amplifier, analog-to-digital (A/D) converter, and digital filter bank. The digital filter bank may make use of multirate digital signal recovery techniques for efficient implementation. In operation, a received signal strength indication (RSSI) is first determined for each subscriber unit requesting access to the basestation. A channel assignment controller then assigns a transmit frequency to the subscriber unit depending upon this RSSI. In particular, subscriber units exhibiting a relatively stronger RSSI are to transmit on a frequency assigned to a first digital tuner section, while subscriber units having a relatively weak RSSI are assigned to a second digital tuner section. The gains of the first and second tuner sections of each other adjusted independently, to insure that the relatively strong signals are not clipped by the first tuner section, and that the relatively weak signals may be correctly detected by the second tuner section. The net effect is to provide a much greater overall system dynamic range. The invention can be used to advantage in both existing AMPS type cellular systems as well as CDMA systems.

25 Claims, 8 Drawing Sheets

OTHER PUBLICATIONS

Chester, et al., "Implementation of a Wide Band, High Dynamic Range Digital Drop Receiver", IEEE Proceedings of ICASSP 91, May 14–17, 1991.

Olmstead et al., "A Digital Tuner for Wideband Receivers", DSP Applications Magazine, Sep., 1992.

Bingham, Multicarrier Modulation for Data Transmission: An Idea Whose Time Has Come (May 1990 pp. 5–14).

Opponheim et al., Discrete–Time Signal Processing 1989, p. 560.

MULTICHANNEL WIDEBAND DIGITAL RECEIVER MAKING USE OF MULTIPLE WIDEBAND TUNERS HAVING INDIVIDUALLY SELECTABLE GAINS TO EXTEND OVERALL SYSTEM DYNAMIC RANGE

FIELD OF THE INVENTION

This invention relates generally to wireless communication networks, and in particular to a wireless communication system basestation making use of two or more wideband, multichannel tuner sections, wherein each tuner section covers some preselected sub-portion of the entire radio frequency bandwidth to be serviced by the basestation, and wherein each tuner section has a gain control which may be adjusted independently of the gain control for at least one of the other tuner sections, and a receiver channel is allocated to a particular tuner section depending upon a received signal strength indication.

BACKGROUND OF THE INVENTION

The providers of current day multiple channel wireless communication services such as cellular mobile telephone (CMT) and personal communication systems (PCS) typically allocate receiver signal processing equipment for each single receiver channel. For example, each basestation is configured to provide communication capability for only a limited number of the channels in the overall frequency spectrum that is available to the service provider.

A typical basestation may thus contain several racks of equipment which house multiple sets of receiver and transmitter signal processing components that service a prescribed subset of the available channels. For example, in an Advanced Mobile Phone Service (AMPS) cellular system, a typical basestation may service only selected number of channels, such as 48, of the total number, such as 416, of the channels available to the service provider.

There recently has been a suggestion that service providers would prefer to employ equipment that would be more flexible, both in terms of where it can be located, as well as in the extent of the available bandwidth coverage provided by a particular transceiver site. This is particularly true in rural areas where cellular coverage may be concentrated along a highway, and for which the limited capacity of a conventional 48 channel transceiver would be inadequate. In other instances, relatively large, secure, and protective structures for multiple racks of equipment are not necessarily available or cost effective, such as in PCS applications.

One way to resolve this difficulty would be to implement the basestation transceiver apparatus using a high speed analog-to-digital (A/D) converter and equipment which makes use of efficient digital filters. On the transmit side, the basestation would also include an inverse FFT processing combiner which outputs a combined signal representative of the contents of the communication channel signals processed thereby. In this manner, relatively compact, lightweight, inexpensive, and reliable digital integrated circuits may be used to cover the entire channel capacity offered by the service provider, rather than only the subset of the available channels. For an more detailed description of such a system, please refer to our co-pending United States patent application entitled "Transceiver Apparatus Employing Wideband FFT Channelizer with Output Sample Timing Adjustment and Inverse FFT Combiner for a Multichannel Communication Network" filed Apr. 10, 1994 and which is assigned to Overture Systems, Inc. the assignee of this application.

In such a configuration, on the receiver side, an antenna feeds a radio frequency tuner which selects an appropriately-sized bandwidth from among the radio frequency bandwidth available to the service provider. The analog tuner typically comprises one or more bandpass filters, amplifiers, local oscillators, and mixers to translate the selected bandwidth to a convenient center frequency at or near a baseband frequency.

The translated baseband signal is then amplified and then digitized by a high speed A/D converter. The A/D converter is characterized by a sampling rate and a digital word size, or resolution. The sampling rate is selected according to the bandwidth to be covered by the receiver, and a minimum sampling rate is at least twice the bandwidth to be covered, as dictated by the well-known Nyquist criterion. The word size is selected depending upon the desired sensitivity of the receiver. The greater the number of bits in each digital word output by the A/D, the greater the sensitivity, or dynamic range.

Current day state of the art circuit technologies typically limit the resolution of the A/D converter to approximately 12 bits at a sampling rate of 25 MegaHertz (MHz). This 12-bit converter thus provides a dynamic range of 72 to 80 decibels (dB) at most. Because analog bandpass filters, amplifier, and mixers are readily available which have a much greater dynamic range, wideband receivers of this type are thus considered to be dynamic range-limited by the A/D converter. This creates a number of problems.

First, the above dynamic range specification is for a signal of a single frequency of predictable maximum amplitude. However, in an application such as a wideband basestation, many signals of different amplitudes are present. Thus, the gain of the amplifier stage prior to the A/D converter must be carefully controlled, so that channel signals having the largest expected magnitude will be received without distortion. If this is not done, the resulting "clipping" of the received signal will create many undesired spurious tones. These spurious tones, in turn, cannot otherwise be separated from the desired lower magnitude signals in adjacent channels.

On the other hand, if the gain of the amplifier is reduced too much, in an effort to avoid the spurious sidelobe effect, this reduces the available dynamic range in the wideband receiver, and the smaller-amplitude signals may fall below the noise floor of the A/D converter, and thus may not be detected at all.

The conventional wisdom is thus that one must either accept a limit on the dynamic range of a wideband digital receiver which makes use of a given A/D converter, for a given basestation bandwidth. Otherwise, one must reduce the bandwidth covered by the digital receiver, so that fewer channels may be processed by a slower-speed A/D converter having a larger number of bits.

What is needed is a way to increase the dynamic range available in a wideband digital basestation, without reducing the bandwidth covered thereby. Indeed, it would be preferable if the receiver could somehow be designed such that this dependency of the bandwidth coverage on the dynamic range of the A/D converter could be eliminated.

SUMMARY OF THE INVENTION

Briefly, the invention is a wideband digital receiver consisting of at least a pair of digital tuner sections. Each digital tuner section consists of an A/D converter and digital filtering equipment dedicated to processing a portion of the entire bandwidth serviced by the receiver. Each radio frequency signal path leading to the input of a digital tuner section has an amplifier with a separately adjustable gain control input. The gain control inputs of the tuner sections may thus be set independently of each other.

In operation, a base station channel assignment controller then assigns subscriber units to operate a channel frequency serviced by one particular tuner section or another, depending upon a received signal strength indication (RSSI) of the signals received from the subscriber unit.

As one example, a first one of the digital tuner sections may be allocated to processing the signals from remote units with relatively strong RSSI, in a range, say, from zero decibels (0 dB) to −70 dB. A second digital tuner may be dedicated to processing the signal received from subscriber units having a somewhat weaker received signal strength of approximately −30 dB to −100 dB. In this manner, even when each of the digital tuner sections makes use of a 72 dB A/D converter, the overall system exhibits a dynamic range of approximately 100 dB, rather than the lower dynamic range provided by a conventional system.

The gain of the first digital tuner section allocated to processing relatively stronger signals can be optimized as needed, so that spurious sidelobes are not created in adjacent channels. The gain of the second digital tuner section allocated to processing relatively weaker signals can also be adjusted independently of the gain of the first digital tuner section, so that even the weakest expected signals are correctly received.

Other difficulties may be avoided as well. For example, a typical multichannel wireless system allocates certain channels for audio signal transmission and other channels for transmission of the control signals that manage access to the audio channels. The control signaling channels will usually exhibit a relatively strong received signal strength indication. Thus, according to the above criteria, those channels are typically assigned to the first digital tuner section which services such stronger signals.

A system operating in this manner will thus exhibit a capture and hold effect which may or may not be desirable. This is because when the control channels are assigned to the tuner section servicing the stronger amplitude signals, a subscriber unit will not be granted access to the system until the control signals it transmits are strong enough to be within the capture range of that first tuner. The first tuner will then continue to process the signals transmitted by that subscriber unit until they become weak enough for hand-off to a second tuner section assigned to process relatively weak signals. The second tuner will then continue to process, or hold the signal from that subscriber unit, continuing to process this relatively weak signal until it is weak enough to require transfer to another basestation site.

Thus, a given subscriber unit will not be captured by a given basestation until it is within a particular close range, but the subscriber unit will continue to be serviced by that same basestation even after it travels beyond that close range, to a range which is typically much greater than the initial capture range.

When this capture and hold effect is not desirable, then one or more narrowband receivers may be used with the wideband digital tuners. The narrowband receivers are dedicated to processing the control channel signals, and the digital tuner sections are then assigned to processing just the voice and/or data information channel signals. This permits the gain of each individual narrowband receiver to be adjusted as needed, such as with a conventional automatic gain control circuit, so that either strong or weak control channel signals are correctly received, while at the same time providing the advantages of having the multiple digital tuner sections.

In another embodiment, the multiple digital tuner sections need not each service the same bandwidth, but rather may each be dedicated to covering a different proportion of the bandwidth serviced by the basestation.

In particular, the relative sizes of the bandwidths covered by individual tuners are selected depending upon the expected distribution of the density of relatively strong signals and relatively weak signals. In the typical situation, where the subscriber units are more or less evenly distributed geographically, there usually are many more weaker signals than stronger signals to be serviced. This is because the received signal strength varies as an inverse exponential of the distance between the basestation and the subscriber unit.

Distributing the bandwidth among different tuner sections can also be advantageous in situations where the basestation is more than one type of subscriber unit. For example, certain emerging standards such as Code Division Multiple Access (CDMA) cellular systems, occupy the same bandwidth as older cellular systems such as Advanced Mobile Phone System (AMPS). The received signal strengths are typically much stronger for AMPS systems which must share the same bandwidth with CDMA systems. Thus, by assigning the stronger amplitude AMPS encoded signals to the first tuner section, and the weaker CDMA encoded signals to the second tuner section, the capture range for the CDMA signals can be greatly improved.

BRIEF DESCRIPTION OF THE DRAWINGS

For a fuller understanding of the nature of the invention, reference should be had to the following detailed description together with the accompanying drawings, in which.

DETAILED DESCRIPTION OF A PREFERRED EMBODIMENT

Figure 1:
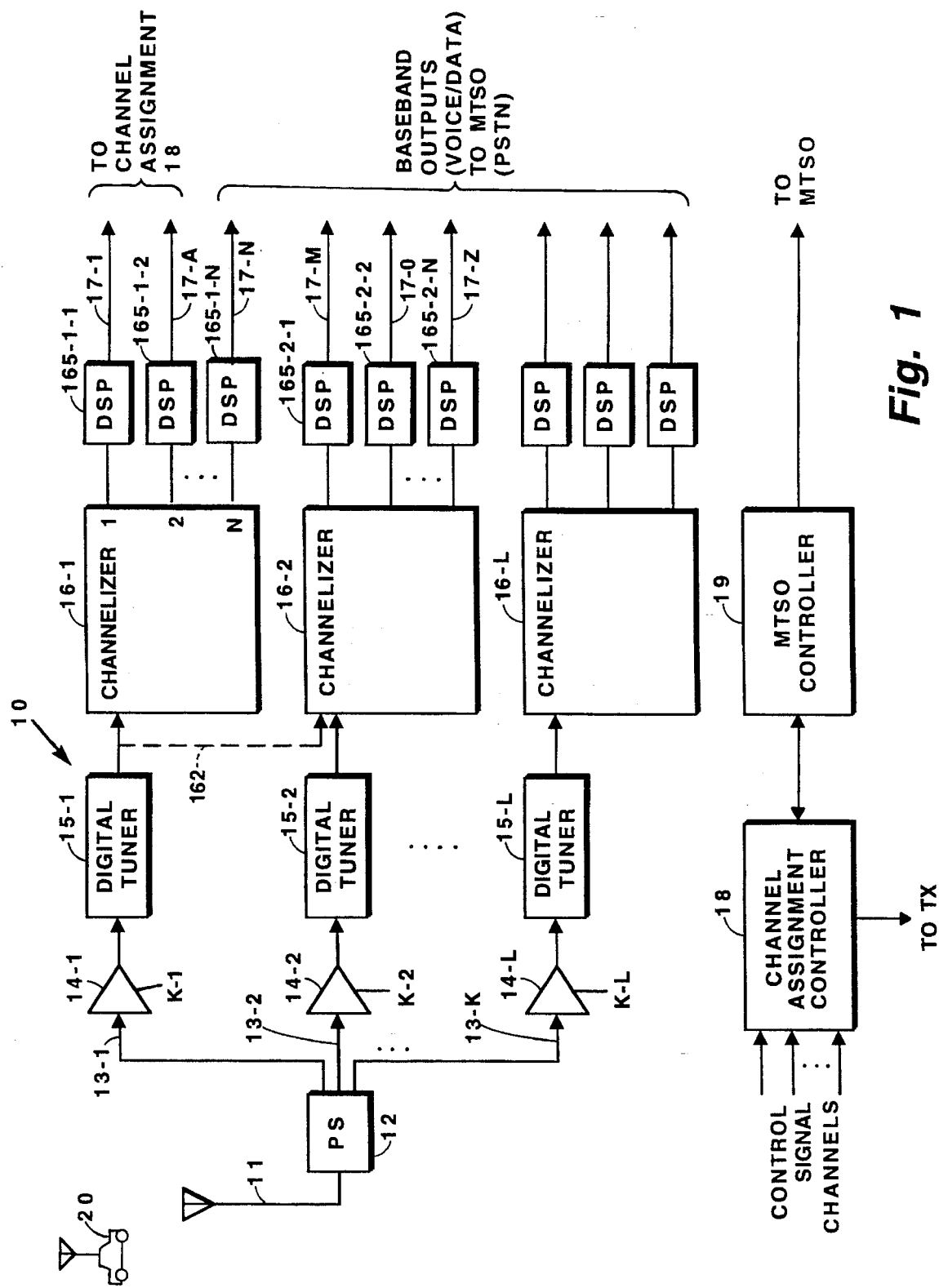
FIG. 1 is a block diagram of a multichannel basestation implementing the invention.

FIG. 1 shows a block diagram of a multichannel basestation 10 implementing the concept of this invention. In particular, the basestation 10 includes an antenna 11, a power splitter 12, a plurality of amplifier units 14-1, 14-2, . . . , 14-K, a plurality of digital tuners 15-1, 15-2, . . . , 15-L, a plurality of digital channelizers 16-1, 16-2, . . . , 16-L, and a channel assignment controller 18.

In operation, radio frequency (RF) energy in the form of electrical signals from subscriber units 20 is first received at the antenna 11. The subscribers 20 may be mobile units, as shown, or portable units. The particular radio frequencies of interest depend upon the particular communication service to which the basestation 10 is being applied. For example, in a cellular mobile telephone (CMT) application operating in accordance with the Advanced Mobile Phone Specification (AMPS), the bandwidth of interest is within the range of approximately 824 MegaHertz (MHz) to 849 MHz. The bandwidth is typically shared by two competing service providers, so-called "System A" and "System B" providers, so that a given AMPS basestation typically has 12.5 MHz of bandwidth available to it.

This approximately 12.5 MHz bandwidth is allocated as four-hundred and sixteen (416) channels, each having a 30 kilohertz (kHz) bandwidth. For the AMPS "System A" service provider, the 416 channels are transmitted over the air from the remote unit 20 in a pair of radio frequency bands, ranging from 824 to 835 MHz and from 845 to 846.5 MHz. For a "System B" service provider, the 416 available channels are transmitted in radio frequency bands ranging from approximately 835 to 845 MHz and from 846.5 to 849 MHz.

While the following discussion will consider the AMPS example in detail, it should be understood that the invention is not limited to a particular cellular system. Thus, other bandwidths and other types of systems such as Personal Communication System (PCS) can be accommodated.

Regardless of the particular radio frequency band of interest, the power splitter 12 divides the signal energy from the antenna 11 among a plurality of signal paths 13-1, 13-2, . . . , 13-L. In the illustrated embodiment, the K signal paths are then each provided as an input to a respective one of the amplifier units 14-1, 14-2, . . . , 14-L.

The gains of the amplifiers units 14-1, 14-2, . . . , 14-L are individually controlled by gain control inputs K-1, K-2, . . . , K-L to determine whether the associated tuner 15-1, 15-2, . . . , 15-L is to service relatively strong or relatively weak signals. The gains of the various amplifiers 14 are thus different from one another, that is the gain setting of the amplifier 14-1 is different from the gain setting K-2 of the amplifier 14-2, which is different from that of amplifier 14-L, and so on.

The gain control of each individual amplifier 14 is set so that the collective sum of the expected signal amplitudes in the bandwidth covered by its respective digital tuner section 15 does not cause a respective analog to digital (A/D) converter used by the tuner 15 to saturate.

Figure 2:
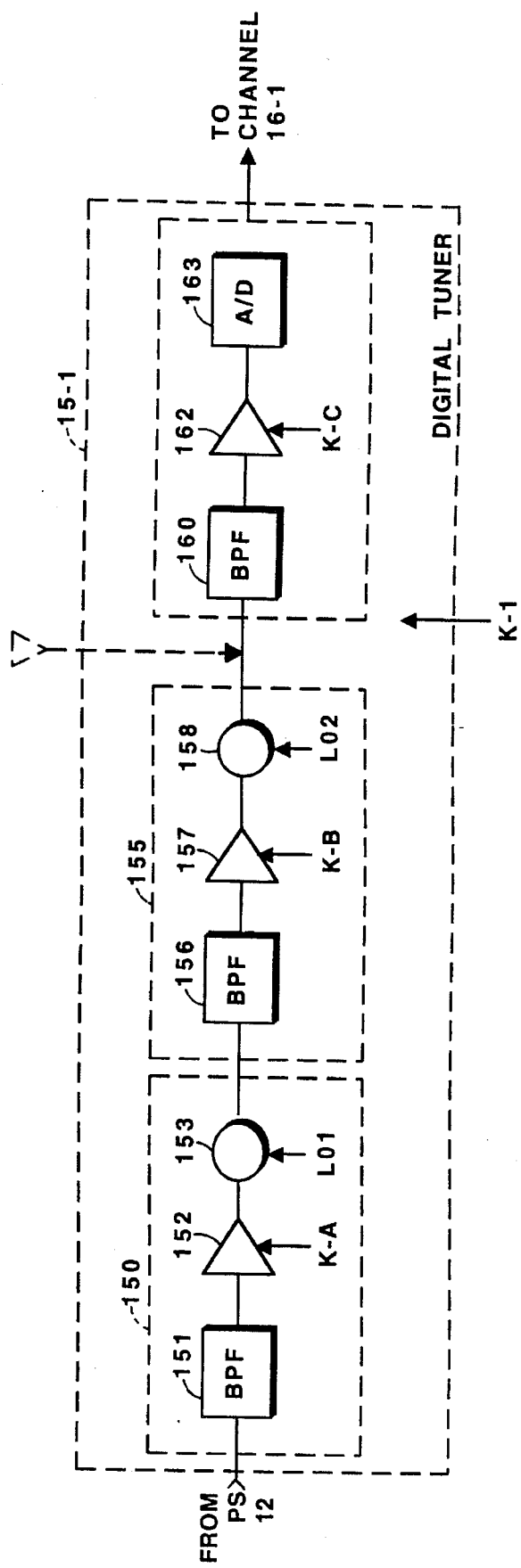
FIG. 2 is a block diagram of one embodiment of a digital tuner portion of the multichannel basestation.

More particularly, the output of each amplifier 14 is coupled to a respective one of the digital tuner sections 15. An exemplary digital tuner section 15-1, shown in FIG. 2, consists of a first downconverter section 150 which includes a first bandpass filter 151, amplifier 152, and mixer 153. A second downconverter section 155, which includes a second bandpass filter 156, and amplifier 157, processes the output of the first downconverter section 150. The downconverter sections 150 and 155 translate radio frequency energy in the selected 12.5 MHz bandwidth of interest to a convenient intermediate frequency (IF) in a well known manner.

A preselector bandpass filter 160 and amplifier 162 select and amplify a predetermined bandwidth portion from the 12.5 MHz bandwidth processed by the basestation 10. In the example being discussed, the preselector bandpass filter 160 may, for example, select only 2.5 MHz of the approximately 12.5 MHz being processed by the basestation 10 to be forwarded to the first tuner section 16-1.

There may or may not be an overlap of the bandwidths covered by the various digital tuners 15-1, 15-2, . . . , 15-L. For example, it may be desirable, for reasons that will become clear later on, for the digital tuner 15-1 to cover some of the same frequencies covered by digital tuner 15-2.

The amplifier unit 14-1 can be any of the various tuner amplifiers 152, 157, and/or 162, and the gain control input K-1 can be used to adjust any or all of their respective gain inputs. What is important is that the gain plan of the entire digital tuner 15-1 be such that the final baseband signal level presented to the input of the A/D converter 163 be controllable. Thus, although a single amplifier unit 14-1 was shown in FIG. 1, it should be understood that this amplifier function may actually be implemented in one or more of the tuner amplifiers 152, 157 and/or 162.

The A/D converter 163 then operates on this baseband signal to provide digital samples, in a manner which is well known in the prior art.

This digital sampled signal, still having an approximately 2.5 MHz bandwidth, must then be further filtered to separate it into the individual 30 kHz channel signals.

Returning attention to FIG. 1, the digital channelizer 16-1, being a bank of digital filters with each filter having a 30 kHz bandwidth, performs this function. The digital channelizer 16-1 may implement the filter bank using any of several different filter structures, and no particular digital filter structure is critical to the operation of the invention. One possible filter bank architecture is described, however, in more detail below. The channelizer 16-1 outputs N individual digital channel signals, with each of the N outputs representing information in one channel.

These digital channel signals 17 are then provided to digital signal processors 165-1-1, 165-1-2, . . . , 165-1-N, which remove any remaining modulation specified by the air interface standard implemented by the basestation 10. The digital signal processors 165 also reformat these baseband audio or data signals as necessary for transmission to a local Mobile Telephone Switching Office (MTSO). For example, the channel outputs may contain voice and/or data information formatted in accordance with the well known T1 standard format for transmission to the MTSO. These T1 signals are then processed by the MTSO in an known fashion to ultimately complete a telephone call from the subscriber unit 20 to the desired destination, such as by using the Public Switched Telephone Network (PSTN).

The channel assignment controller 18 also communicates with the MTSO via an MTSO control interface 19, in order to perform the control functions necessary to set up a call. For example, when a subscriber unit wishes to place a call, a subscriber unit 20 indicates this by transmitting one or more of the appropriate control signals on one of the radio frequency channels dedicated for control signaling. The basestation 10 provides these control signals at certain ones of the channel outputs 17-1, . . . , 17-A, and they are in turn forwarded to the channel MTSO control interface 19 to set up the end to end connection.

In the AMPS system being described, the "System A" control channels are present in a frequency band from 834.36 to 835 MHz, and the "System B" control signals are present from 835 to 835.63 MHz. In the embodiment shown, the various preselector filters in the digital tuners 15-1, 15-2, ..., 15-N insure that the control channels are processed by the first digital tuner section 16-1, rather than some other tuner section 16-2, ..., 16-K. The control signal channels 17-1, ..., 17-A are then provided to both the channel assignment controller 18 and the MTSO control interface 19 in order to set up the call.

Figure 3:
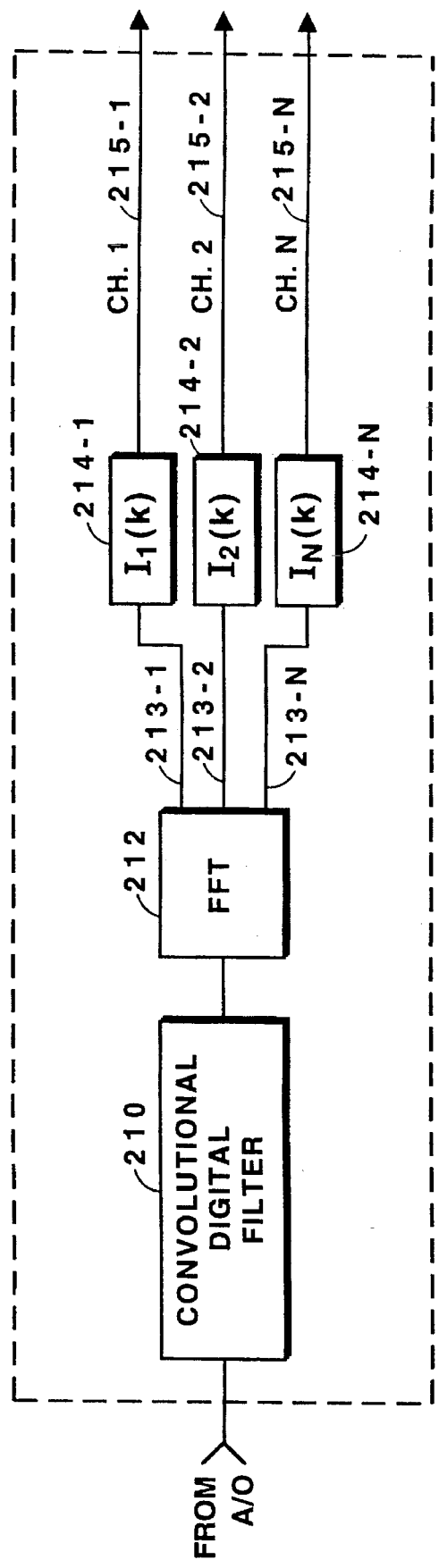
FIG. 3 is a more detailed view of one embodiment of a wideband digital channelizer portion of the multichannel basestation.

As mentioned previously, the digital channelizer 16-1 uses any suitable digital filtering algorithm to separate the channels. In the preferred embodiment, however, the digital channelizer 16-1 makes use of multirate digital signal processing techniques to minimize the amount of necessary computation. As shown in FIG. 3, the channelizer 16-1 thus preferably consists of a convolutional digital filter 210, a fast Fourier transform (FFT) unit 212, and a plurality, N, of interpolating lowpass filters 214-1, 214-2, ..., 214-N. In operation, the convolutional digital filter 210 accepts the sampled signal from the respective A/D converter 163 (FIG. 1) and performs a first set of convolutional operations necessary to separate the wideband digital input signal into the N digital channel signals. The convolutional filter 20 may be a so-called overlap and add digital filter, or may be a polyphase digital filter.

As a second step in the channelization process, the output of the convolutional filter 2 10 is passed to an N-point, complex valued FFT engine 212. The N FFT output taps represent N time-domain, bandpass-filtered signals, with each such signal representing one of the 416 channels processed by the basestation 10.

Before passing the individual digital signals to the DSP processors 165-1-1 through 165-1-N, each digital channel signal output by the FFT processor 212 may also be processed by a sample rate adjuster 214-1, ..., 214-N which adjusts the effective timing of the sample values in each digital channel signal 213-1, 213-2, ..., 213-N. These rate adjusters 214 make use of a multirate digital signal processing technique to minimize the rate at which samples must be provided by the FFT processor 212. Each rate adjuster 214 provides samples of its respective digital channel signal 213 taken at or near a position of peak symbol amplitude.

For a more detailed explanation of a preferred embodiment of the channelizer 16-1, reference should be had to a co-pending U.S. Patent Application entitled "Transceiver Apparatus Employing Wideband FFT Channelizer with Output Sample Timing Adjustment and Inverse FFT Combiner for a Multichannel Communication Network", filed Apr. 10, 1994, and which is assigned to Overture Systems, Inc., the assignee of the present application.

Returning attention to FIG. 1 briefly, it has been mentioned above that the gain control inputs K-1, K-2, ..., K-L are carefully chosen to provide increased dynamic range of the overall system 10. In particular, the gain K-1 of the signal path through the first digital tuner section 15-1 is, for example, adjusted to capture and service the channels having the largest expected received signal strength indication (RSSI). The signal path through the second digital tuner section 15-2 has a slightly larger gain. That second tuner 15-2 is thus meant to exclusively service channels having a somewhat smaller RSSI. If required, additional amplifiers 14-3, ..., 14-K and tuner sections 15-3, ..., 15-K are employed to service channels having still smaller RSSI's.

Thus, in accordance with a fundamental concept of the invention, upon receiving a control signal indicating that a subscriber unit 20 wishes to place a call, the channel assignment controller first determines the RSSI of the signals received from the subscriber unit 20. The channel assignment controller 18 then assigns a transmit frequency to the subscriber 20 depending upon the value of the RSSI. Subscriber units 20 having a relatively strong RSSI are assigned a transmit frequency covered by the first tuner 15-1, and subscriber units 20 having relatively weaker RSSI are assigned a transmit frequency covered by the second tuner 15-2.

Figure 4:
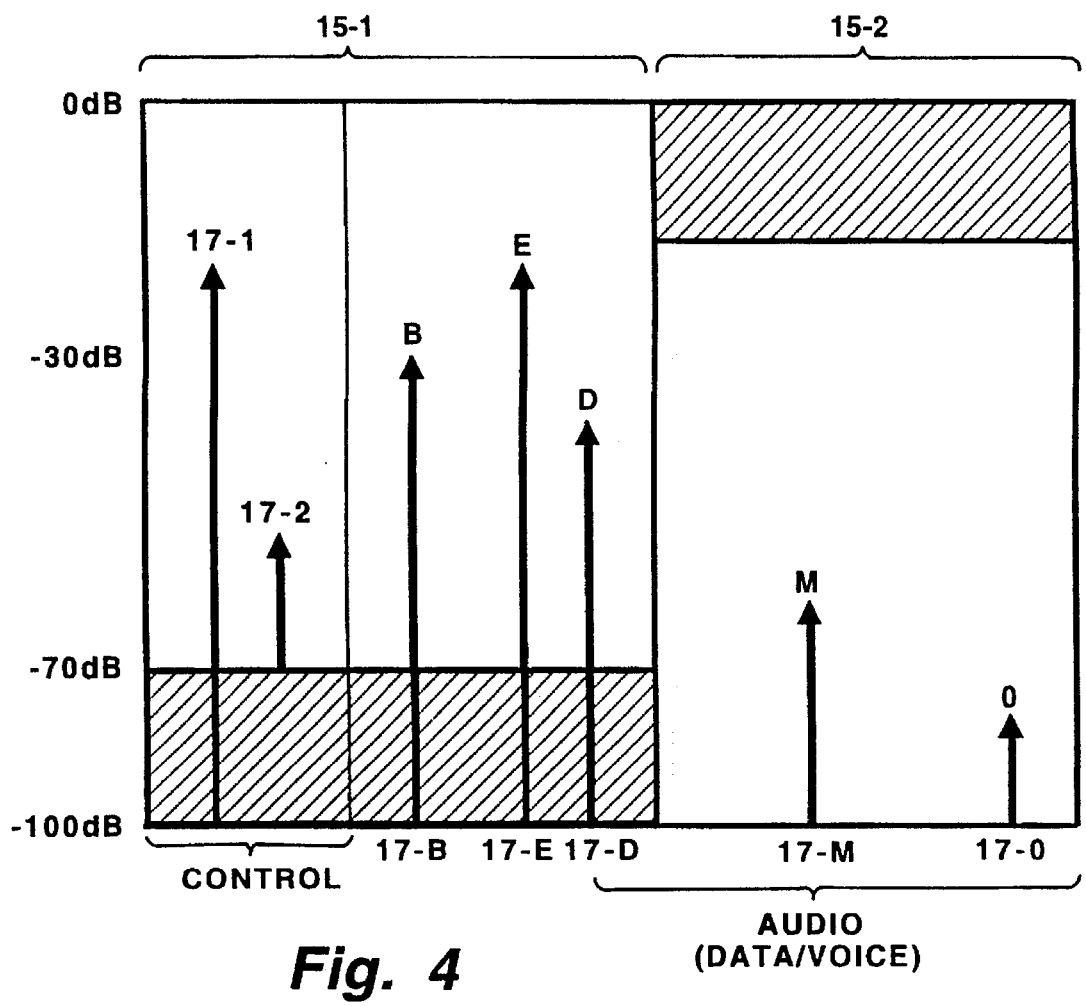
FIG. 4 is a plot of amplitude in decibels versus frequency for the output of two of the channelizers used in the basestation.

FIG. 4 is a plot illustrating how two of the digital tuner sections 15-1 and 15-2 may be employed in this manner. The plot is of frequency spectrum covered by the basestation 10, with signal amplitude along the vertical axis and frequency along the horizontal axis. The horizontal axis represents the entire bandwidth covered by the basestation 10. As indicated above the plot, the first tuner 15-1 is dedicated to covering a contiguous section of the lower frequencies in the bandwidth of interest, while the second tuner 15-2 covers the upper frequency portion.

Certain subscriber units, identified by the signals indicated by reference letters B, E, and D, have been assigned to channels 17-B, 17-E, and 17-D covered by the first digital tuner section 15-1 and first channelizer 16-1. The signals from these subscribers are being received with a relatively strong RSSI, from 0 to −70 dB. Subscriber units providing relatively weaker RSSI, such as the signals indicated by letters M and O, are assigned to the second digital tuner 15-2 and second channelizer 16-2. These signals from these subscribers are being received with relatively weaker amplitudes.

The horizontal lines and shading represent the amplitude coverage provided by each digital tuner section 15. For example, with reference to tuner section 15-1, the gain control K-1 is set such that the magnitudes of the digital samples output by its respective A/D converter 163-1 map to analog amplitudes of 0 dB to −70 dB. That is, the maximum magnitude digital sample maps to approximately −0 dB, and a minimum magnitude digital sample maps to −70 dB. For the second tuner 15-2, the gain of the amplifier 14-2 is set so that the maximum and minimum amplitudes map to −30 and −100 dB, respectively.

Figure 5:
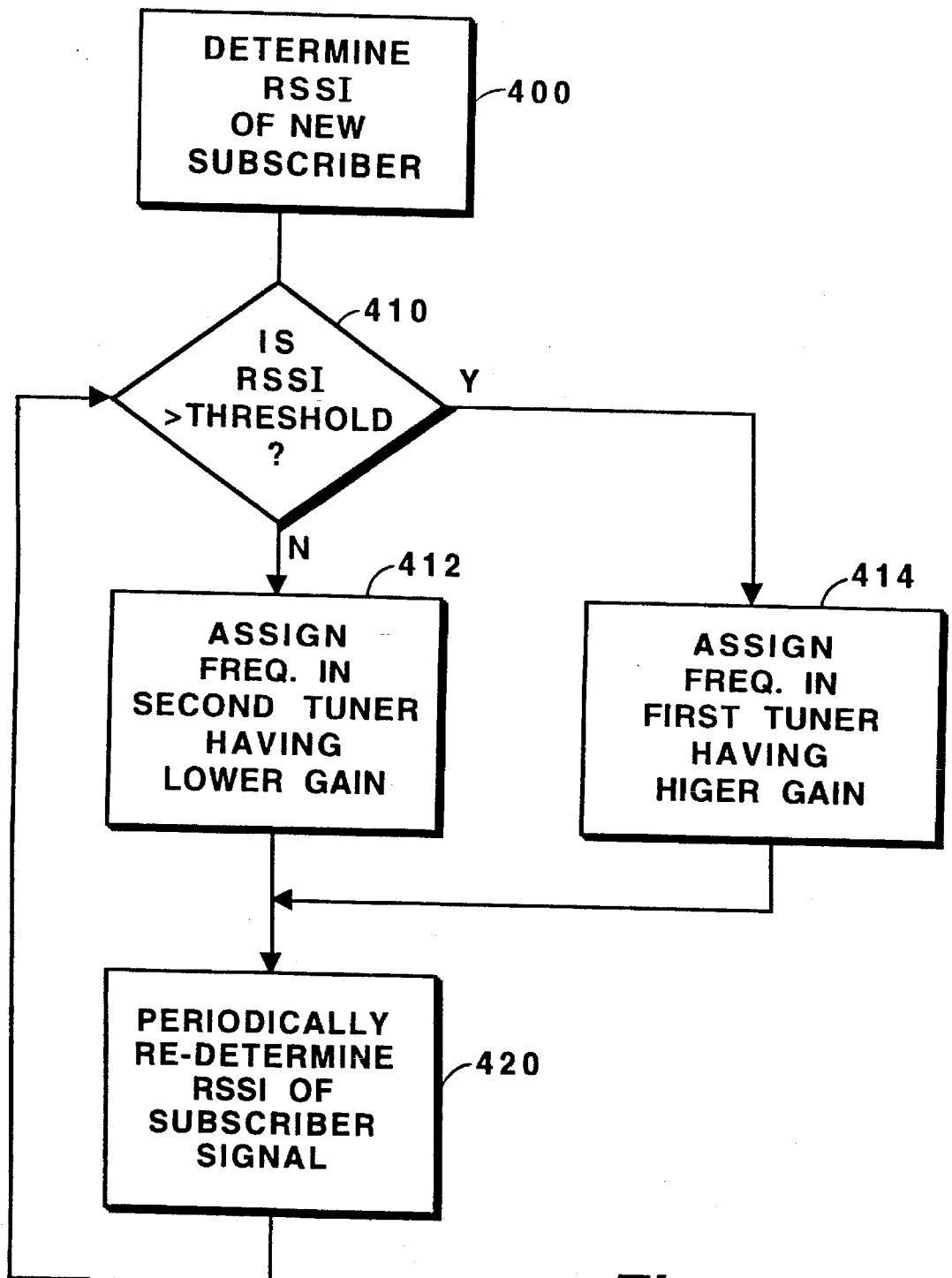
FIG. 5 is a flow chart of a sequence of operations performed by a channel assignment controller.

As shown in the flowchart of FIG. 5, to accomplish this result, the channel assignment controller 18 initially assigns a request by a subscriber unit 20 for a new channel based upon the received signal strength indication of the control signal received from the subscriber unit 20. In particular, as shown at step 400, the RSSI of the signal from the control channel 17-1, ..., 17-A assigned to the subscriber 20 is first determined. At step 410, if the RSSI of the control channel signal received from the subscriber unit 20 is above a predetermined threshold, such as at least about −30 dB, then it is assigned to a frequency covered by the first tuner 15-1 in step 414. Such is the case in FIG. 4 for the unit transmitting signal B, which has been assigned to a channel 17-B covered by the first tuner 15-1. If however, in step 410, the RSSI is weaker than the threshold, such as for signal M in FIG. 4, then the subscriber unit 20 is assigned a channel frequency such as 17-M covered by the second tuner 15-2.

The subscriber unit 20 is then enabled to transmit audio signals on the assigned channel, and is permitted to place the call. During progress of the call, as indicated by step 420 of FIG. 4, the RSSI of the channel to which the subscriber unit 20 has been assigned continues to be monitored by the channel assignment controller 18. As necessary, that is, if the amplitude of the RSSI changes, the subscriber unit 20 may eventually be re-assigned to one of the other tuners 15.

To accomplish the assignment of a frequency to the subscriber unit 20, a transmitter portion of the basestation 10 (not shown) originates an in-band control signal in a manner which is well known and specified by the AMPS standard. The in-band control signal instructs the remote unit 20 to switch to the new transmit frequency.

This approach thus permits both relatively strong and relatively weak amplitude signals to be captured and processed by the same basestation 10, thereby increasing the overall effective dynamic range of the basestation 10.

While the above process has been described for a system having two tuners 15-1 and 15-2, it should be understood that multiple comparisons against multiple RSSI thresholds may be done to assign the subscriber to one of three or even one of N channels.

With this system, the control channels, such as channels 17-1 and 17-2, must typically be assigned to the first tuner 15-1, in order to prevent strong control signal amplitudes such as that of channel 17-1 from being clipped. Otherwise, undesired spurious tones would be created within the control channel bandwidth.

Figure 6:
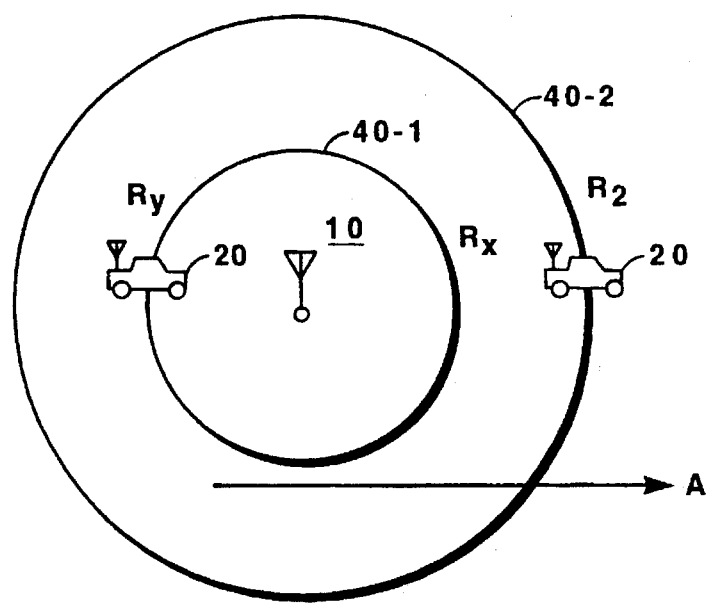
FIG. 6 is a diagrammatic view of the basestation and a remote mobile unit illustrating the capture and hold phenomenon experienced with the embodiment of FIG. 1.

However, using this arrangement, a capture and hold effect will be observed by the subscriber unit 20. In particular, as shown in FIG. 6, the subscriber unit 20 will not obtain access to the basestation 10 until it is within a particular distance, or range, $R_1$, from the basestation 10. Assuming an omni-directional radiation pattern, the range $R_1$ corresponds to a distance at which the first tuner 15-1 can detect the control signal transmitted by the subscriber unit 20, that is, the point at which the RSSI of the control signal rises above the −70 dB point (FIG. 4). The remote unit 20 is then assigned a transmit channel with the bandwidth of the first tuner 15-1, such as channel 17-D (FIGS. 4 and 5).

As the remote unit 20 continues the call while moving in the direction of the arrow A, the RSSI of the transmit channel 17-D continues to be monitored by the channel assignment controller 18. When the RSSI of channel 17-D becomes weak, that is, when its RSSI drops close to −70 dB at a point $R_x$, the remote unit 20 is handed off to the second tuner 15-2.

Tuner 15-2 then continues to process the signal from remote unit 20, which is now assigned to the frequency 17-M. This continues until the RSSI of the channel 17-M is weak enough to require transferring control of remote unit 20 to another cell site. This point, at range $R_2$, corresponds to an RSSI of about −100 dB, is the maximum extent of the range of the digital tuner 15-2.

Figure 7:
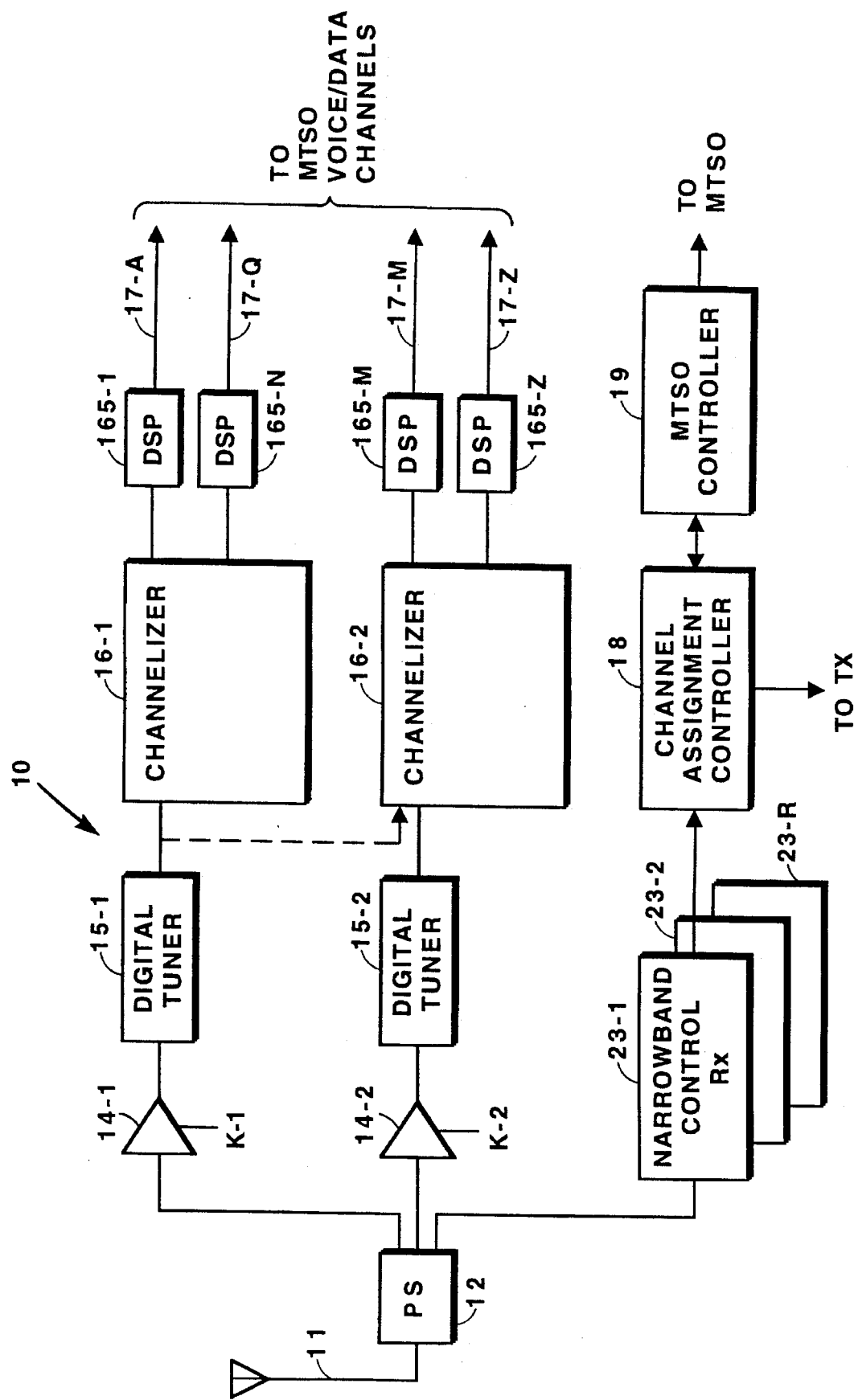
FIG. 7 is a block diagram of a multichannel basestation using separate narrowband control receivers to eliminate the capture and hold effect of FIG. 6.

While the basestation 10 will operate under these circumstances, the capture and hold effect may not be desirable in some instances. If so, then one or more narrowband control receivers can be used together with the wideband digital tuner sections 15-1 and 15-2, as shown in FIG. 7. As for the embodiment of FIG. 1, the basestation 10 again includes an antenna 11, a power splitter 12, IF amplifier units 14, tuners 15, channelizers 16, and digital signal processors 165. However, the power splitter 12 also provides a signal 13-K to a number of narrowband control receivers 23-1, 23-2, . . . , 23-R.

The narrowband control signal receivers 23 each service only one of the 30 kHz control signal channels 17-1, 17-2, . . . , 17-A. Thus, the individual control channel receivers 23-1, 23-2, . . . , 23-R may have separately adjustable gains, and indeed, may typically use known automatic gain control techniques to process signals having RSSI's over the entire desired capture range of 0 to −100 dB of the basestation 10. In this manner, the capture and hold effect can be eliminated.

Also as for the FIG. 1 embodiment, the control channel signals from the narrowband control channel receivers 23 are in turn provided to the channel assignment controller 18, which, as explained above in connection with FIG. 4, determines how to assign an audio transmit channel 17-A, . . . , 17-Q, 17-M, . . . , 17-Z to a particular remote unit.

Figure 8:
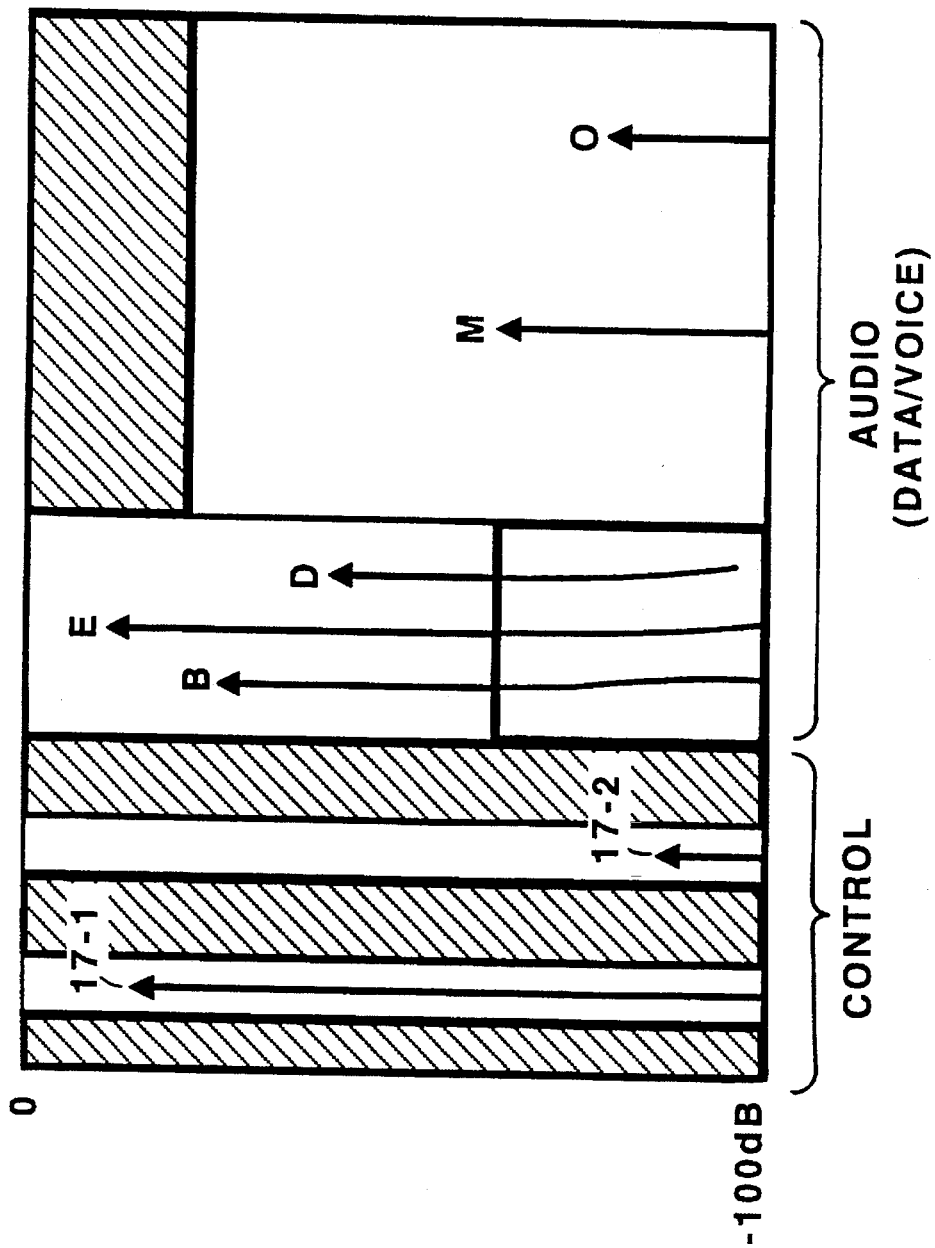
FIG. 8 is a plot of amplitude in decibels versus frequency for the various digital tuner sections of the embodiment of FIG. 7.

FIG. 8, which is a plot similar to FIG. 4, illustrates how the arrangement of FIG. 7 provides a uniform capture effect for the control channels. As shown, a strong control channel signal 17-1 transmitted by a subscriber 20 at a close range, $R_1$, as well as a weak control channel signal 17-2 transmitted from a distant range, $R_2$, are both now properly received.

For either of the embodiments of FIG. 1 or FIG. 7, the tuners 15-1, 15-2, . . . , 15-K need not cover equal bandwidths, and may also cover overlapping bandwidths. This is especially of interest when one considers that the RSSI of a given subscriber unit 20 varies as the inverse square function of its range to the basestation 10. Thus, assuming an approximately even geographic distribution of remote units in the area surrounding the basestation 10, there are typically many more signals with relatively weak RSSI magnitudes.

For example, if the tuner 15-1 has an expected capture radius, $R_1$, of one (1) mile, and the second tuner has a capture radius, $R_2$, of two (2) miles, the second tuner 15-2 may thus typically need to process four times as many channels as the first tuner 15-1. Accordingly, the bandwidth covered by tuner 15-2 is thus arranged to be twice that covered by tuner 15-1.

For either of the embodiments of the invention shown in FIG. 1 or FIG. 7, it may also be desirable, depending upon the application of the basestation 10 and the desired dynamic range and frequency coverage of each tuner section 15, to include two or more channelizers 16 connected to the output of each A/D converter 163. This is indicated by the dashed line 162 in FIGS. 1 and 7. This feature may be desirable in situations where the basestation 10 must provide channelization according to two different air interface standards.

It may also be necessary for the basestation 10 to process relatively high magnitude, narrowband-encoded channel signals, as well as relatively low magnitude, wideband-encoded channel signals which occupy the same bandwidth. For example, it may be desirable for the basestation 10 to process AMPS channel signals each having a bandwidth of 30 kHz, while at the same time processing Code Division Multiple Access (CDMA) channel signals each having a bandwidth of 1.25 MHz, even where the AMPS and CDMA channels occupy the same RF bandwidth. This is accomplished by using two tuners 15 and two channelizers 16, with each tuner 15 and channelizer 16 being configured to service one of the respectively different channel bandwidths and expected signal strengths.

Thus, the invention provides an additional advantage for certain second generation cellular systems such as those making use of CDMA encoding of the audio channels. CDMA cellular signals typically use the same transmit frequencies as AMPS-type signals. However, because of the high frequency pseudorandom encoding specified for CDMA, a typical CDMA signal has a much smaller amplitude and a much wider bandwidth than a typical AMPS signal. The basestation for such a CDMA system, and especially a hybrid basestation which must process both AMPS and CDMA signals, is thus required to detect and correctly receive lower amplitude CDMA signals as well as higher amplitude AMPS signals.

Certain ones of the tuners 15 and channelizers 16 may thus be dedicated to processing the higher amplitude AMPS signals, such as tuner 15-1 and channelizer 16-1 while another tuner 15-2 and channelizer 16-2 can be dedicated to processing the much lower amplitude CDMA channels.

Figure 9:
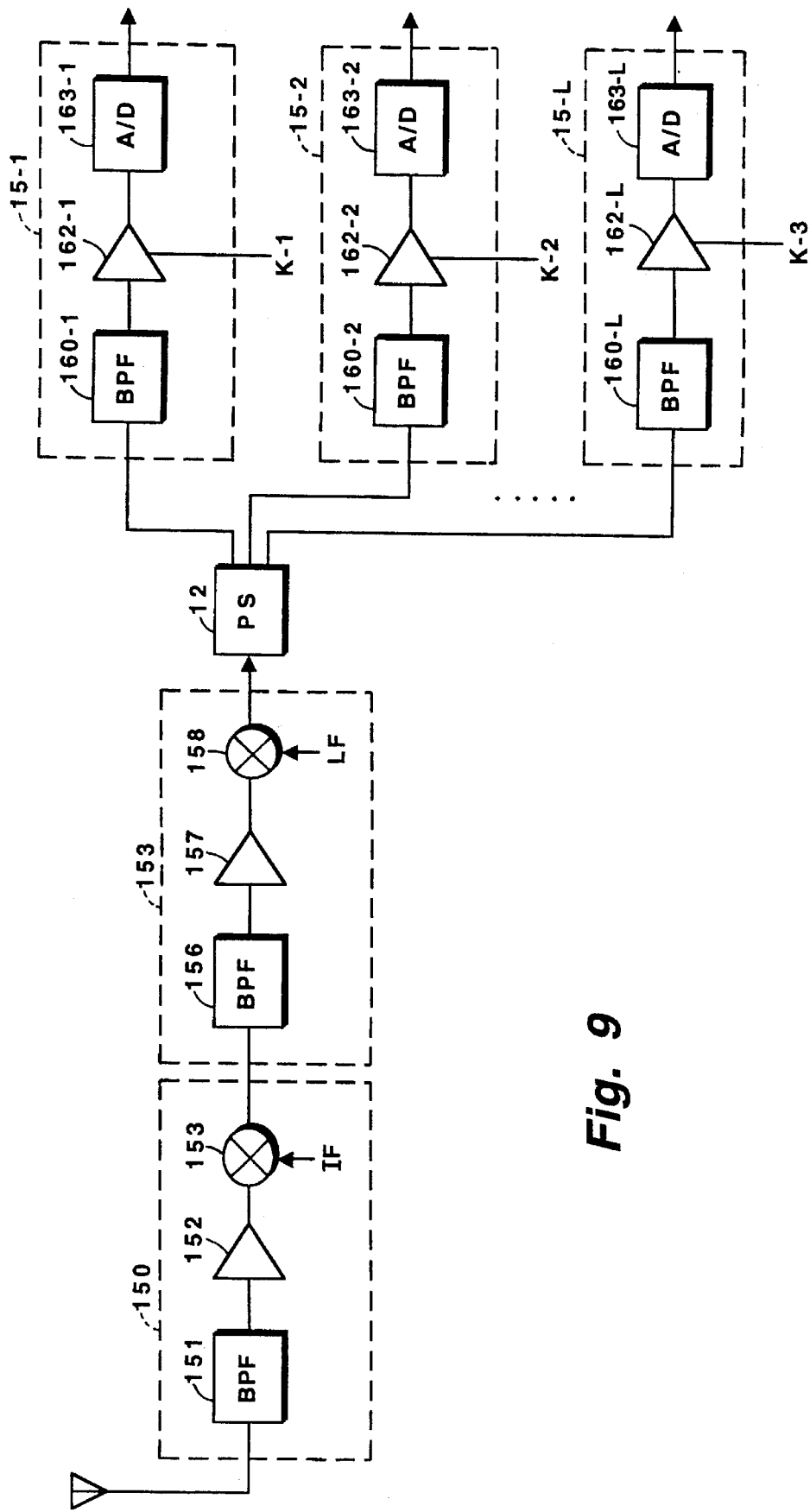
FIG. 9 is an alternate embodiment of the digital tuner portion of FIGS. 1 and 7.

An alternate arrangement of the functions performed by the front end portion of the basestation 10, including the power splitter 12, amplifiers 14-1, 14-2, . . . , 14-L, and digital tuner sections 15-1, 15-2, . . . , 15-L is also possible. 14-2, . . . , 14-L, and digital tuner sections 15-1, 15-2, . . . , 15-L is also possible. As shown in FIG. 9, the RF-IF downconverter 150 and IF-to-LF downconverter 155 may be shared among the various digital tuners 15-1, 15-2,. . . , 15-L. In other words, the position of the downconverters 150, 155 and the power splitter 12 may be reversed. However, when the front end of the basestation 10 is configured as shown in FIG. 9, the dynamic range sensitivities for each of the prefilters 160-1, 160-2, . . . , 160-L and amplifiers 162-1, 162-2, . . . , 162-L will be greater than for the arrangement of FIG. 1.

In addition, rather than use the architecture of FIG. 3, the channelizers 16 may make use of a digital integrated circuit which accepts a wideband digital input and provides a downconverted output, such as HSP 50016 Digital Downconverter sold by Harris Semiconductor, Inc., of Palm Bay, Fla.

While we have shown and described several embodiments in accordance with the present invention, it is to be understood that the invention is not limited thereto, but is susceptible to numerous changes and modifications as known to a person skilled in the art, and we therefore do not wish to be limited to the details shown and described herein but intend to cover all such changes and modifications as are obvious to one of ordinary skill in the art. and we therefore do not wish to be limited to the details shown and described herein but intend to cover all such changes and modifications as are obvious to one of ordinary skill in the art.

What is claimed is:

1. A basestation for processing signals in a multiple subscriber unit wireless communication system comprising:

an antenna for receiving signals from a plurality of the subscriber units;

a power splitter, connected to the antenna, to provide a plurality of power splitter output signals;

a plurality of gain control means, each one of the gain control means being connected to receive a respective one of the power splitter output signals, and each gain control means having a separately adjustable gain control input, and each gain control means providing a wideband signal;

a plurality of wideband tuner sections, with each tuner section being connected to receive one of the wideband signals, and with each wideband tuner section operating over a respectively different frequency bandwidth, and each wideband tuner section being connected to provide a wideband tuner output signal;

a plurality of channelization means, each channelization means being connected to receive a respective one of the wideband tuner output signals, and with each channelization means providing multiple channel signal outputs, each channel signal output having a predetermined channel bandwidth; and channel assignment means, including:
   (i) access control signal receiving means, for receiving an access control signal requesting access to a radio frequency channel by a selected one of the subscriber units, and for determining a received signal strength indication, RSSI, of that access control signal;
   (ii) means for generating a frequency control signal designating a selected transmit frequency, and for receiving the RSSI of the access control signal, the selected transmit frequency being selected from within a first frequency bandwidth over which a first one of the plurality of wideband tuner sections operates if the RSSI is above a minimum threshold and within a first range of signal strengths associate with the first wideband tuner section, and the transmit frequency being selected within a second frequency bandwidth over which a second one of the plurality of wideband tuner sections operates if the RSSI is above the minimum threshold and within a second range of signals strengths associated with the second wideband tuner section; and
   (iii) frequency assignment means for receiving the frequency control signal and for assigning the selected subscriber unit to operate on the selected transmit frequency.

2. A wideband receiver subsystem the use in a communication system wherein multiple subscriber units each transmit a communication signal on a selected radio frequency carrier signal within a prescribed radio frequency bandwidth, the wideband receiver subsystem comprising:

(a) an antenna, arranged to receive radio frequency energy within the prescribed radio frequency bandwidth, and to provide an antenna output signal;

(b) power splitting means, connected to receive the antenna signal, and to provide a plurality of power splitter output signals;

(c) a first wideband digital tuner section connected to receive one of the power splitter output signals, the first wideband digital tuner section including:
   (i) first amplifier means, connected to receive one of the power splitter output signals, and to provide a first amplified signal, the first amplifier means having a first gain;
   (ii) a first analog-to-digital (A/D) converter, connected to receive the first amplified signal, and to provide a first digitized wideband signal;

(d) a first channelizer, connected to receive the first digitized wideband signal, the channelizer operating to bandpass-filter the first digitized wideband signal into a first plurality of digital channel signals, each digital channel signal corresponding to a digitized version of the communication signal transmitted by one of the subscriber units operating in a first radio frequency bandwidth;

(e) a second wideband digital tuner section connected to receive one of the power splitter output signals, the second wideband digital tuner section including:
   (i) second amplifier means, connected to receive one of the power splitter output signals, and to provide a second amplified signal, the second amplifier means having a second gain;
   (ii) a second analog-to-digital (A/D) converter, connected to receive the second amplified signal, and to provide a second digitized wideband signal;

(f) a second channelizer, connected to receive the second digitized wideband signal, the channelizer operating to bandpass-filter the second digitized wideband signal into a second plurality of digital channel signals, each digital channel signal corresponding to a digitized version of the communication signal transmitted by one of the subscriber units operating in a second radio frequency bandwidth; and (g) a channel assignment controller including:
   (i) a signal strength detector, connected to receive the digital channel signals from the first channelizer, for determining the received signal strength indication, RSSI, of at least one particular one of the radio frequency transmitter carrier signals for a particular one of the subscriber units;

(ii) means for generating a frequency control signal designating a selected transmit frequency, and for receiving the RSSI from the signal strength detector, the selected transmit frequency being a transmitter carrier frequency covered by the first or second digital channelizer depending upon the RSSI, such that the subscriber unit is assigned to a transmitter carrier frequency in the first radio frequency bandwidth if the RSSI is above a minimum threshold and within a predetermined first range, and the subscriber unit is assigned to a transmitter carrier frequency in the second radio frequency bandwidth if the RSSI is above a minimum threshold and within a predetermined second range; and (iii) frequency assignment means, for receiving the frequency control signal and for assigning the particular subscriber unit to operate on the selected transmit frequency.

3. A wideband receiver system as in claim 2 wherein the first and second channelizers comprise digital filters.

4. A wideband receiver system as in claim 3 wherein the first and second channelizers each comprise:

a convolutional digital filter, connected to receive the respective one of the digitized wideband signals; and a fast Fourier transform, processor, connected to receive the output of the convolutional digital filter, and to provide the digital channel signals.

5. A wideband receiver system as in claim 4 wherein the convolutional digital filter is an overlap and add digital filter.

6. A wideband receiver system as in claim 4 wherein the convolutional filter is a polyphase digital filter.

7. A wideband receiver system as in claim 2 wherein the first gain of the first amplifier is selected such that a relative magnitude of zero (0) decibels maps to a largest expected magnitude of a collective sum of the digital channel signals output by the first digital tuner.

8. A wideband receiver system as in claim 7 wherein the second gain of the second amplifier is selected such that a largest expected channel signal magnitude for subscriber units assigned to the second tuner maps to a largest expected channel signal magnitude for subscriber units assigned to the second tuner maps to a largest expected magnitude of a collective sum of the digital channel signals output by the second digital tuner.

9. A wideband receiver system as in claim 2 wherein the communication signals transmitted by the subscriber units include control signals, and wherein the control signals are transmitted on predetermined radio frequency carrier signal channels, and wherein the channel assignment controller assigns the control signal channels to the first digital tuner.

10. A wideband receiver system as in claim 2 wherein the communication signals transmitted by the subscriber units include control signals, and wherein the control signals are transmitted on predetermined radio frequency carrier signal channels, and wherein the wideband receiver system additionally comprises:

a plurality of narrowband control channel receivers, coupled to the antenna, for receiving the control channel signals.

11. A wideband receiver system as in claim 10 wherein the narrowband receivers include an automatic gain control circuit.

12. A wideband receiver system as in claim 2 wherein the first digital tuner section covers a different number of channels than the number of channels covered by the second digital tuner section.

13. A wideband receiver system as in claim 12 wherein the number of channels covered by the first and second digital tuner sections depends upon an expected density distribution of the RSSI of the channel signals received from the subscriber units.

14. A wideband receiver system as in claim 2 wherein the wideband receiver system receives communication signals transmitted using broadband encoding as well as communications signals using narrowband encoding schemes, wherein the RSSI of the broadband encoded channel signals is weaker than the RSSI of the narrowband encoded channel signals, and wherein the channel assignment controller additionally assigns a subscriber unit transmitting narrowband encoded channel signals to a transmitter carrier frequency covered by the first digital tuner section, and the channel assignment controller assigns a subscriber unit transmitting broadband encoded channel signals to a transmitter carrier frequency covered by the second digital tuner section.

15. A wideband receiver as in claim 14 wherein the broadband encoding is a Code Division Multiple Access (CDMA) encoding.

16. A wideband receiver as in claim 2 additionally comprising:

a first bandpass filter, disposed between the first amplifier and the first A/D converter, for determining the bandwidth of the first digitized signal.

17. A wideband receiver as in claim 2 additionally comprising:

a second bandpass filter, disposed between the second amplifier and the second A/D converter, for determining the bandwidth of the second digitized signal.

18. A wideband receiver as in claim 2 wherein the channel assignment controller assigns a transmitter carrier frequency to the subscriber unit by causing a control signal to be transmitted which, in turn, causes the subscriber unit to transmit its communication signals on the assigned transmitter carrier frequency.

19. A wideband receiver as in claim 2 wherein the first predetermined threshold equals the second predetermined threshold.

20. A wideband receiver as in claim 2 wherein the first predetermined threshold is less than the second predetermined threshold.

21. A wideband receiver as in claim 2 wherein the wideband receiver system receives communication signals transmitted using a first air interface standard as well as a second air interface standard.

22. A wideband receiver as in claim 2 wherein the first predetermined threshold amount is equal to the second predetermined threshold amount.

23. A wideband receiver as in claim 2 wherein the first predetermined threshold amount is not equal to the second predetermined threshold amount.

24. A wideband receiver system the use in a communication system wherein multiple subscriber units each transmit a communication signal on a radio frequency transmitter carrier signal within a prescribed radio frequency bandwidth, the wideband receiver comprising:

an antenna, arranged to receive radio frequency energy within the prescribed radio frequency bandwidth;

a downconverter section, connected to the antenna, to translate the prescribed radio frequency bandwidth to an intermediate frequency, and to provide a translated wideband signal;

a first amplifier, connected to receive the translated wideband signal, and to provide a first amplified signal, the first amplifier having a first gain;

a second amplifier, connected to receive the translated wideband signal, and to provide a second amplified signal, the second amplifier having a second gain;

a first digital tuner section including a first analog-to-digital, A/D, converter, connected to receive a respective one of the amplified signals, and to provide a first digitized wideband signal;

a first channelizer, connected to receive the first digitized wideband signal, the channelizer operating to bandpass filter the first digitized wideband signal into a first plurality of digital channel signals, each digital channel signal corresponding to the communication signal transmitted by one of the subscriber units;

a second channelizer, connected to receive the first digitized wideband signal, the second channelizer operating to bandpass filter the first digitized wideband signal into a second plurality of digital channel signals, each digital channel signal corresponding to the communication signal transmitted by one of the subscriber units operating in a second radio frequency bandwidth; and channel assignment controller including:
  (i) a signal strength detector, connected to receive the digital channel signals from the first digital tuner section, for determining the received signal strength indication, RSSI, of at least one particular one of the radio frequency transmitter carrier signals for a particular one of the subscriber units;
  (ii) means for generating a frequency control signal designating a selected transmit frequency, and for receiving the RSSI from the signal strength detector, the selected transmit frequency being a transmitter carrier frequency covered by the first or second digital tuner depending upon the RSSI, such that the subscriber unit is assigned to a transmitter carrier frequency covered by the first digital tuner section if the RSSI is above a minimum threshold and within a predetermined first range, and such that the subscriber unit is assigned to a transmitter carrier frequency covered by the second digital tuner section if the RSSI is above the minimum threshold and within a predetermined second range; and
  (iii) frequency assignment means, the receiving the frequency control signal and for assigning the particular subscriber unit to operate on the selected transmit frequency.

25. A wideband receiver system as in claim 24 wherein the wideband receiver system receives communication signals transmitted using broadband encoding as well as communications signals using narrowband encoding schemes, wherein the RSSI of the broadband encoded channel signals is weaker than the RSSI of the narrowband encoded channel signals, and wherein the channel assignment controller additionally assigns a subscriber unit transmitting narrowband encoded channel signals to a transmitter carrier frequency covered by the first digital channelizer section, and the channel assignment controller assigns a subscriber unit transmitting broadband encoded channel signals to a transmitter carrier frequency covered by the second digital channelizer section.

* * * * *